Figure 1:
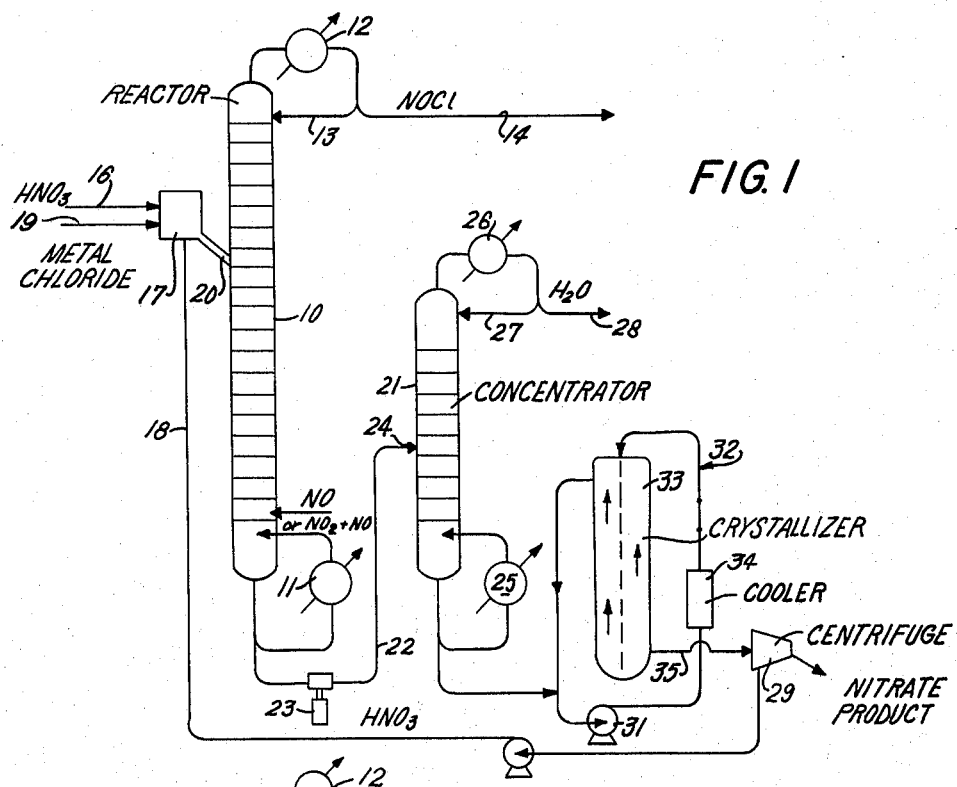

Oct. 26, 1965  H. A. BEEKHUIS  3,214,240
PROCESS OF REACTING CHLORIDES WITH NITRIC ACID
Filed Dec. 13, 1962

INVENTOR.
HERMAN A. BEEKHUIS
BY
Benjamin Sweedler
ATTORNEY

United States Patent Office 3,214,240
Patented Oct. 26, 1965

3,214,240
PROCESS OF REACTING CHLORIDES
WITH NITRIC ACID
Herman A. Beekhuis, Media, Pa., assignor to Halby
Chemical Co., Inc., Wilmington, Del., a corporation
of Delaware
Filed Dec. 13, 1962, Ser. No. 244,499
16 Claims. (Cl. 23—102)

This invention relates to the reaction of chlorides, namely hydrogen chloride, alkali metal and alkaline earth metal chlorides, with nitric acid.

All percentages herein are given on a weight basis, unless otherwise indicated.

Alkali metal and alkaline earth metal chlorides react with nitric acid to produce the corresponding metal nitrate, chlorine and nitrosyl chloride in accordance with the equation:

(1) $4HNO_3 + 3MeCl \rightleftharpoons 3MeNO_3 + NOCl + Cl_2 + 2H_2O$ in which Me is an alkali metal or alkaline earth metal, e.g., potassium, sodium, calcium, magnesium or other alkali or alkaline earth metal. Hydrogen chloride reacts with nitric acid to produce nitrosyl chloride and chlorine in accordance with the equation:

(2) $HNO_3 + 3HCl \rightleftharpoons NOCl + Cl_2 + 2H_2O$

Both of these equations represent chemical equilibria, the nitrosyl chloride and chlorine react with water to form nitric and hydrochloric acids thus reversing the reaction in the case of Equation 2 and in the case of Equation 1 these acids tend to react with the metal nitrate to form metal chloride and thus reverse the reaction. Because of the reverse reaction, in order to convert the chloride reasonably completely, it is necessary to use a large excess of nitric acid, at elevated temperatures, and to strip chlorides from the aqueous reaction liquor with acid vapors.

Moreover, it is also necessary to concentrate the reaction mixture and recycle the reconcentrated nitric acid thus obtained to avoid waste of the excess acid. When hydrogen chloride is reacted with nitric acid the reaction mixture contains chiefly nitric acid diluted with water formed in the reaction and introduced into the reactor as part of the aqueous nitric acid solution. When a metal chloride is reacted with nitric acid the reaction mixture contains chiefly metal nitrate, nitric acid and water. This reaction mixture is concentrated, metal nitrate is crystallized from the concentrated reaction mixture and the mother liquor recycled to the reactor. In the concentration, water introduced into the process with the nitric acid feed, that formed by the reaction, and water introduced into process from other sources such as that employed in washing the metal nitrate crystals to remove any adhering nitric acid therefrom, is removed. Due to the high concentration of nitric acid present in the reaction mixture, removal of water without loss of nitric acid requires a highly efficient rectification column operated with a high reflux ratio, which column adds substantially to the expense of the equipment required for carrying out the process and of the operation of such equipment. Furthermore, due to residual chloride present in the reaction mixture the concentration of the reaction mixture containing a relatively high concentration of nitric acid, say above 50% by weight, must be carried out under severely corrosive conditions, and is accompanied by volatilization and loss of chlorine and nitrosyl chloride with the water being removed.

It is a principal object of the present invention to provide a process for reacting chlorides with nitric acid under conditions resulting in a reaction mixture containing a markedly lower nitric acid concentration than in the reaction mixtures of heretofore known procedures of reacting chlorides with nitric acid, and thus minimize corrosion problems both in the concentration of the reaction mixture and in the crystallization of the metal nitrate from concentrated reaction mixtures containing same, and this without sacrifice to the substantially complete conversion of the chloride to metal nitrate or hydrogen chloride to nitrosyl chloride.

Other objects and advantages of this invention will be apparent from the following detailed description thereof.

In accordance with this invention, a chloride, namely, an alkali or alkaline earth metal chloride or hydrogen chloride, or a mixture of such chlorides, is reacted with nitric acid in the presence of nitric oxide. The presence of the nitric oxide, I have found, reduces substantially the quantity of excess nitric acid needed to convert the metal chloride to metal nitrate and nitrosyl chloride or to convert hydrogen chloride to nitrosyl chloride. Carrying out the reaction in the presence of the nitric oxide, the vapors generated by the reaction mixture when the nitric oxide is present consist substantially entirely of nitrosyl chloride; they may contain a small amount of nitric oxide, nitrogen dioxide and water, but are substantially free of chlorine. After depletion of the nitric oxide as the vapors rise and reaction takes place between the incoming fresh nitric acid and the chloride in the upper portion of the column, the vapors thus generated may contain chlorine.

The reaction of the metal chloride in the presence of nitric oxide can be represented by the following equation:

(3) $4HNO_3 + 2NO + 3MeCl = 3NOCl + 3MeNO_3 + 2H_2O$

When reacting hydrogen chloride with nitric acid, the reaction can be represented by the following equation:

(4) $3HCl + HNO_3 + 2NO = 3NOCl + 2H_2O$

Since nitrosyl chloride cannot generate the strongly acid solutions obtainable from nitrosyl chloride and chlorine, little reverse reaction takes place when reacting the chloride with the nitric acid in the presence of nitric oxide and the reaction mixture at the base of the reactor contains markedly lower concentrations of nitric acid or chloride, or both. Stated otherwise equilibrium conditions for reaction (3) above favor much more complete reaction than using reaction (1) above with consequent formation of a reaction mixture containing less nitric acid or chloride or both. The nitric acid in the reaction liquor in the base of the reactor has a concentration of from 30% to 45% on a salt free basis with substantially complete conversion of hydrogen chloride to nitrosyl chloride when reacting hydrogen chloride with nitric acid and of the metal chloride to metal nitrate and nitrosyl chloride when reacting a metal chloride with nitric acid. This compares with nitric acid concentrations of from 50% to 65% or higher on a salt free basis necessary to obtain substantially complete conversion of chlorides in heretofore known procedures of reacting chlorides with nitric acid.

Because of these lower acidities, concentration of the reaction mixture withdrawn from the reactor and the recovery of metal nitrate free of nitric acid from the concentrated reaction mixture can be accomplished more readily and with a saving in the nitric acid as well as minimization of the corrosion problems. As is well known, the proportion of nitric acid vapor in equilibrium with liquid nitric acid increases rapidly with increase in the acid strength of the liquid. Hence the concentration of relatively concentrated nitric acid, say, having concentrations above 50%, requires an efficient rectification column operated at high reflux ratio. On the other hand, the concentration of nitric acid having strengths below 45% and desirably of from 30% to 40%, can readily be effected in a relatively small distillation column, for example, one having from 4 to 10 theoretical plates, and this with minimization of corrosion problems due to the weaker acid subjected to distillation.

Other advantages of carrying out the reaction of the nitric acid with the chloride in the presence of nitric oxide rather than without the nitric oxide are:

(a) The heat required for reaction (3) is about one-half as much as for reaction (1). This factor is responsible for the marked saving in the heat input requirements for the reaction.

(b) Introduction of nitric oxide directly into the liquor at the base of the reactor reduces the partial pressure of water vapor (needed for sensible heat and latent heat higher up in the column) and thus the "boiling" temperature of the liquor.

(c) The rate of reaction (3) is higher than for reaction (1) as indicated by a more ready approach to equilibrium. This permits using a reactor column with fewer theoretical trays.

(d) The vapors taken off overhead tend to have less nitrogen dioxide when using reaction (3) than reaction (1). This permits using less reflux and fewer contact trays in the upper section of the column.

The nitric acid and metal chloride and/or hydrochloric acid are reacted in approximately stoichiometric proportions in the presence of from 0.05 to 1.50, preferably 0.5 to 1.0, mols of nitric oxide per mol of hydrochloric acid or metal chloride. The quantity of nitric acid introduced into the process as fresh nitric acid having a concentration of from 40% to 65%, should be sufficient to maintain the nitric acid acidity at from 30% to 45% on a salt free basis, preferably 30% to 40% at the base of the reactor. The introduction of fresh nitric acid in approximately the stoichiometric amount for reaction with the chloride, whether as metal chloride, or hydrogen chloride, or a mixture of both, accomplishes this result when the reaction is carried out in the presence of the nitric oxide.

When reacting nitric acid with metal chloride the proportions of fresh nitric acid and metal chloride introduced into the reactor should approximate the stoichiometric amount of 4 mols nitric acid and 3 mols metal chloride, for example, from 3.5 mols to 5 mols nitric acid per 3 mols of metal chloride. When reacting nitric acid and hydrogen chloride the proportions of fresh nitric acid and hydrogen chloride introduced into the reactor should approximate 1 mol of nitric acid to 3 mols of hydrogen chloride.

The temperature conditions are not critical. Temperatures at the base of the column reactor can be varied from about 50° C. to boiling, preferably in the range of 75° C. to 125° C. In general, it is preferred to introduce the nitric acid at a point in the column where the temperature is 25° C. to 50° C., usually at a point near the top of the column, but the nitric acid may be introduced at a point in the column where the temperatures are higher than 50° C. When it is desired to take off overhead a substantially dry nitrosyl chloride gas, the temperature at the top of the column where the gas is withdrawn from the column should not exceed about 25° C. However, where a wet gas is not objectionable then the reaction column can be operated with temperatures as high as about 100° C. at the top of the column and preferably somewhat higher temperatures at the base of the column.

As compared with heretofore known procedures for reacting chlorides with nitric acid in which nitric oxide is not introduced into the reaction mixture, the temperature conditions at the base of the reactor where the nitric oxide is introduced are lower because:

(a) The nitric oxide gas lowers the partial pressure of the water vapor and thus the "boiling" temperature.

(b) The quality of water vapor needed to supply heat for reaction above the base section is less since the reaction is less endothermic. For comparable operations, temperatures at the base will run 10° C. to 20° C. lower when using nitric oxide plus nitric acid rather than just nitric acid.

As indicated, temperatures at the top of the reactor are generally lower than at the base. If the upper section of the reactor is heated indirectly rather than only with hot vapors from the base the top temperatures can approach or even exceed those at the base. Employing a high top temperature, the exit gas contains substantial amounts of water vapor and some nitrogen dioxide and hence such high top temperature should not be used where the production of an overhead gas containing these materials is objectionable. Low top temperatures are obtained, by refluxing condensate, by indirect cooling and/or by using cold feed.

Pressures are not critical and for reasons of economy, it is preferred to operate under ambient pressure conditions. However, super-atmospheric pressures can be used, in which case the temperature conditions within the column would be increased proportionately to the increase in pressure.

The overhead vapors are normally condensed and desirably a portion of the condensate is returned as reflux. The relative amounts thus returned can be varied as desired unless a dry off-gas or one containing little or no nitrogen dioxide is desired. In the latter event, from 10% to 50% of the condensate produced by condensing the overhead vapors is returned as reflux to insure the retention within the column of substantially all of the water vapor and nitrogen dioxide so that the exit vapor stream contains little or no moisture when a dry gas is desired, and little or no nitrogen dioxide when a nitrosyl chloride stream is desired substantially free of nitrogen dioxide.

The nitric oxide gas introduced into the column, desirably at or near the bottom of the column, reacts in two ways, namely:

$$NO+2HNO_3=3NO_2+H_2O$$
$$2NO+4HNO_3+3KCl=3NOCl+3KNO_3+2H_2O$$

Both of these reactions serve to deplete the nitric acid strength of the reaction mixture before the latter is withdrawn from the reaction column and fed to the acid concentrator. The relative quantities of $NO_2$ and $NOCl$ formed are dependent on the strength of the nitric acid, concentration of chloride and temperature. High temperature, low chloride and high acid strentgh favor the formation of nitrogen dioxide. Because of the high temperature and low chloride at the base of the reactor, a substantial quantity of nitrogen dioxide is formed at this point. However, this has no observable overall effect because the nitrogen dioxide rises in the column, reacts with the chloride in the middle and upper sections of the column where the temperature is lower and the chloride concentration is higher in accordance with the reaction $$2NO_2+MeCl=NOCl+MeNO_3$$

It is preferred to add the nitric acid with the metal chloride to the column at a point near the top along with recycle solution which can be the mother liquor when metal chloride is crystallized from the reaction mixture after concentration thereof or concentrated nitric acid when reacting hydrogen chloride with nitric acid to produce nitrosyl chloride.

If desired the nitrosyl chloride gas taken off overhead can be liquified and the liquid returned in part as reflux to the upper portion of the column reactor; the remainder is withdrawn as product. Alternatively, the nitrosyl chloride gas can be withdrawn from the top of the column and scrubbed with water to remove any nitrogen dioxide present. Instead of water, the nitrosyl chloride gas can be scrubbed with sulfuric acid to absorb and remove from the nitrosyl chloride both water and nitrogen dioxide which may be admixed therewith. Sulfuric acid at a concentration of about 70% or less is used because higher strength sulfuric acid will react with the nitrosyl chloride to form HCl and $HNSO_5$ in accordance with the equation:

$$H_2SO_4+NOCl=HNSO_5+HCl$$

The reaction mixture from the reactor is passed to an acid concentrator where it is subjected to distillation to remove overhead water of reaction and water introduced in the process. As noted, a relatively short column, not more than 4 to 10 theroetrical trays is sufficient to reflux the limited amount of acid vaporized in the concentrator to effect concentration of the reaction mixture removed from the reactor. When reacting hydrogen chloride with nitric acid in the presence of nitric oxide, the nitric acid withdrawn from the base of the reactor and thus concentrated desirably to a concentration of 50% to 68% is returned to the reactor.

When reacting a metal chloride with nitric acid, if desired, the concentrator can be operated at an absolute pressure off from 0.03 to 0.10 atmosphere, in which case the base of this acid concentrator can serve to crystallize the metal nitrate, thus eliminating the necessity for using a separate crystallizer. After crystallization either in the concenrator or in a separate crystallizer the slurry is centrifuged to recover the metal nitrate and the acid mother liquor containing from 35% to 68% nitric acid on a salt free basis, is returned to the reactor.

Nitrogen dioxide can be used in the process, to reduce the amount of nitric acid which would otherwise be required. Nitrogen dioxide can be obtained in part by the oxidation of nitrosyl chloride or from ammonia oxidation. Nitrogen dioxide when used is preferably introduced at a point in the reactor column where the temperature is within the range of from 75° C. to 125° C. The nitrogen dioxide can be introduced admixed with the nitric oxide. When nitrogen dioxide is used, the amount can be from 0.20 to 1.60 mols per mol of chloride and when used in such proportions results in a saving of from 10% to 80% of the amount of nitric acid required to obtain substantially complete conversion of the chloride.

The preferred source of nitric oxide used in the process may vary from plant to plant depending on the availability of nitric oxide at a particular location. If desired, it can be produced by decomposition of a portion of the nitrosyl chloride product by reaction with water or iron pyrites.

Figure 2:
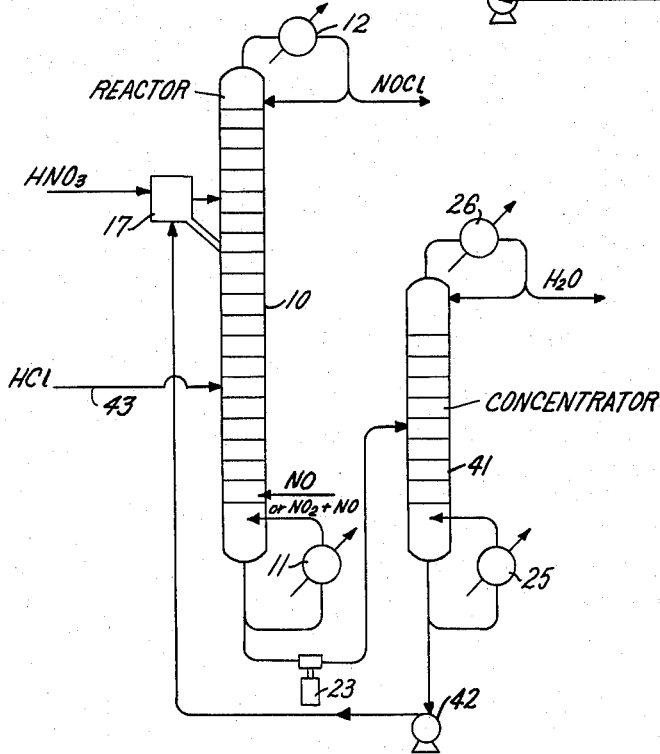

In the accompanying drawings is shown, for purposes of exemplification, preferred diagrammatic layouts of equipment for practicing the present invention. It will be understood, however, that this invention is not limited to the arrangement of equipment shown. In the drawings, FIGURE 1 is a preferred diagrammatic layout of the equipment for practicing the process of this invention involving the reaction of a metal chloride with nitric acid in the presence of nitric oxide; and FIGURE 2 is a preferred diagrammatic layout of equipment for practicing the process of this invention involving the reaction of hydrogen chloride and nitric acid in the presence of nitric oxide.

In the drawing, 10 is a combination reaction and distillation column provided with distillation trays, a boiler 11 at its base and a nitric oxide feed line NO leading into the lower portion thereof. A condenser 12 is arranged to receive the vapor stream coming off from the top of distillation column 10. In operations involving utilization of the nitrosyl chloride as vapor, condenser 12 effects little or no condensation of the nitrosyl chloride content of the vapor stream passing therethrough; the condensate is then chiefly water, hydrogen chloride, nitric acid and nitrogen tetroxide. The condensate from condenser 12 is divided into two streams, one of which is returned as reflux through line 13 and the other passed together with uncondensed vapor through line 14 to storage or treatment of the nitrosyl chloride. From 10% to 100% of the amount of liquid condensate is returned as reflux through line 13. Fresh nitric acid is supplied to the reactor 10 through line 16 leading into a slurry mixer 17 into which the recycle feed is supplied through line 18. The metal chloride is introduced into the slurry mixer 17 through line 19. The resultant slurry enters the reactor 10 through line 20.

Reactor 10 is provided with at least 3 theoretical trays below the slurry feed point; while more than 5 theoretical plates can be used, desirably from 5 to 10, for reasons of economy in construction and operation the number above 5 is kept to a minimum consistent with reduction of the chloride content of the bottoms to a practical minimum. The number of theoretical trays above the slurry feed point can be from 0 to 10.

The recycle acid concentrator 21 is in the form of a distillation column having from 4 to 10 theoretical trays. This column communicates through line 22 and pump 23 with the base of the metal chloride reactor 10 so that the bottoms from this reactor flow continuously through line 22 leading into column 21 at point 24. A boiler 25 communicates with the base of this column for maintaining the reaction products at the boiling point, i.e., about 120° C.

The top of this column communicates with a condenser 26 for condensing the vapor leaving the column. The condensate is divided into two streams, one of which is returned as reflux through line 27 and the other is removed through line 28. Alternatively, all the vapors from concentrator 21 may be vented with or without prior condensation, using either plain water or wash water from centrifuge 29 as reflux.

Pump 31 pumps the solution or slurry from concentrator 21 through the circulating system 32 of the crystallizer 33. Circulating system 32 comprises a cooler 34 through which the supernatant liquid from the crystallizer flows. The cooled liquid is mixed with the solution or slurry and the mixture is pumped into the crystallizer 33. Crystals are withdrawn from the base of the crystallizer 33 through the line 35 and enter the centrifuge 29 which effects the separation of the metal nitrate crystals from the mother liquor. The mother liquor flows through the line 18 into the slurry mixer 17. Instead of the heat exchange type crystallizer shown, vacuum type crystallizers as well as other known types of crystallizers can be used.

FIGURE 2 differs from FIGURE 1 chiefly in that the acid concentrator 41 is provided with a return line having a pump 42 for return of the concentrated acid to the reactor 10, a line 43 for introduction of hydrogen chloride into the reactor 10, and the crystallizer 33 and associated pump and equipment are omitted.

The following examples are given for purposes of illustrating the invention. It will be understood that the invention is not limited to these examples. In these examples all pound values are pounds per hour, percentages are on a weight basis, and temperatures are in degrees centigrade.

*Example 1*

This example is carried out in equipment of the type shown in FIGURE 1.

126 pounds of 67 weight percent nitric acid consisting of 84.5 pounds nitric acid and 41.5 pounds water is introduced to the slurry mixer 17. Also introduced at this point are:

(a) 74.5 pounds of potassium chloride
(b) 417.5 pounds of recycle mother liquor consisting of:
    100 pounds potassium nitrate
    190 pounds water
    126.5 pounds nitric acid
    1 pound of potassium chloride Into the base of the column is introduced 20.6 pounds of nitric oxide gas. Heat is supplied to the base of the column operated at a temperature of about 120° C. at such a rate as to maintain a temperature of about 60° C. at the point where the mixture from the slurry mixer 17 is introduced into the column reactor 10. Vapors leaving the reaction column are cooled to a temperature of 10° C. and all the condensate refluxed. There remains after cooling these vapors to 10° C., 66.5 pounds vapor containing 65.5 pounds of nitrosyl chloride, 0.5 pound nitric oxide, and 0.5 pound nitrogen dioxide.

572 pounds of a mixture consisting of 201 pounds of potassium nitrate, 1 pound potassium chloride, 126.5 pounds nitric acid and 243.5 pounds water, and thus having a nitric acid concentration of 34% on a salt free basis is obtained from the base of the reactor and concentrated for the removal of 53.5 pounds of water. The concentrated solution is cooled to about 50° C. to crystallize potassium nitrate. 101 pounds of potassium nitrate is recovered and 416.5 pounds of mother liquor containing 100 pounds of potassium nitrate, 1 pound potassium chloride, 126.5 pounds of nitric acid and 190 pounds of water is recycled to the reactor.

*Example II*

This example is similar to Example I except that, in addition to the KCl feed, hydrochloric acid gas is fed to the reaction column at a point between the NO addition near the bottom and KCl addition near the top.

158 pounds of 67 weight percent nitric acid consisting of 106 pounds of nitric acid and 52 pounds of water is introduced to the slurry mixer 17. Also introduced at this point are:

(a) 74.5 pounds of potassium chloride
(b) 411 pounds of recycle mother liquor consisting of:
    100 pounds of potassium nitrate
    1 pound of potassium chloride
    170 pounds of water
    140 pounds of nitric acid Into the base of the column is introduced 42.5 pounds nitric oxide gas and into a mid-point of the column 36.5 pounds of hydrochloric acid gas. Heat is applied to the base of the column at such a rate as to maintain a temperature of 50° C. to 60° C. at the KCl feed point and a temperature of 110° C. at the base of the column. Vapors leaving the reaction column are cooled to 20° C. All of the condensate formed is returned as reflux and the remaining vapors consisting of 135 pounds containing 131 pounds nitrosyl chloride, 2.5 pounds nitric oxide, 1 pound of nitrogen dioxide and 0.5 pound of water withdrawn through line 14.

587.5 pounds of a mixture consisting of 201 pounds of potassium nitrate, 1 pound potassium chloride, 140 pounds nitric acid and 245.5 pounds water is obtained from the base of the reactor and sent to the concentrator where 75.5 pounds of water is removed. The solution is cooled for crystallization of potassium nitrate. After removal of 101 pounds of crystalline potassium nitrate 411 pounds of mother liquor containing 100 pounds of potassium nitrate, 1 pound potassium chloride, 170 pounds of water and 140 pounds of nitric acid remains and is recycled to the slurry mixer.

*Example III*

This example is similar to Example I except that a portion of the nitric acid plus nitric oxide is replaced by nitrogen dioxide (or tetroxide).

70 pounds of 60 weight percent nitric acid consisting of 42 pounds of nitric acid and 28 pounds of water is introduced into the slurry mixer 17. Also added at this point are:

(a) 74.5 pounds of potassium chloride
(b) 401 pounds of mother liquor consisting of:
    100 pounds of potassium nitrate
    160 pounds of water
    140 pounds of nitric acid
    1 pound of potassium chloride Into the base of the column is introduced 12 pounds of nitric oxide; 47 pounds of nitrogen dioxide is introduced at a point a few trays above the base of the column. The base of the column is heated to a temperature of about 110° C. and at such a rate as to maintain a temperature of about 50° C. at the point where the slurry of nitric acid, potassium chloride and recycle mother liquor is introduced. Vapors leaving the reaction column are cooled to a temperature of —10° C. and 25% of the condensate is returned as reflux liquid. The remainder consisting of 68.5 pounds contains 65.5 pounds of nitrosyl chloride, 2 pounds of nitric oxide and 1 pound of nitrogen dioxide, is withdrawn through line 14.

536 pounds of a mixture consisting of 201 pounds of potassium nitrate, 1 pound of potassium chloride, 140 pounds of nitric acid and 194 pounds of water is obtained from the base of the reactor and concentrated for the removal of 34 pounds of water. The solution is then cooled to crystallize and remove 101 pounds of potassium nitrate leaving 401 pounds of mother liquor containing 100 pounds of potassium nitrate, 1 pound of potassium chloride, 160 pounds of water and 140 pounds of nitric acid for recycle.

*Example IV*

This example involves the reaction of nitric acid with hydrogen chloride and is carried out in equipment of the type shown in FIGURE 2.

127.8 pounds of 50 weight percent nitric acid consisting of 63.9 pounds of nitric acid and 63.9 pounds of water is introduced into the mixer 17. Also added at this point are 302 pounds of recycle liquor containing:

180 pounds nitric acid
    120 pounds water
    2 pounds hydrochloric acid

Into the base of the column is introduced 30.3 pounds of nitric oxide and directly into a mid-point of the column 109.5 pounds of dry hydrochloric acid gas. Heat is applied to the base of the column at such a rate as to maintain a temperature of 60° C. to 75° C. at the HNO₃ feed point and a boiling condition at the base. Vapors leaving the reaction column are condensed by cooling to a temperature of about —25° C. About 20% of the condensate formed is returned as reflux and the remainder consisting of 167.5 pounds containing 35.5 pounds of chlorine, 131 pounds nitrosyl chloride and 1 pound of nitrogen dioxide is withdrawn.

402 pounds of a mixture consisting of 180 pounds of nitric acid, 2 pounds of hydrochloric acid and 220 pounds of water is withdrawn from the base of the reactor and sent to the concentrator where 100 pounds of water is removed. 302 pounds of solution containing 180 pounds of nitric acid, 2 pounds of hydrochloric acid and 120 pounds of water remains and is recycled to the mixer.

It will be noted the present invention effects reaction of a chloride with nitric acid in the presence of nitric oxide resulting in a reaction mixture having a markedly lower nitric acid concentration and this without sacrifice to the yield of metal nitrate when converting a metal chloride to metal nitrate or the substantially complete conversion of hydrochloric acid to nitrosyl chloride. Also the weaker acid thus employed enables concentration thereof with marked saving in nitrosyl chloride, employing smaller and less expensive distillation or concentration equipment and with minimization of corrosion problems in handling the concentration of the reaction mixture and in effecting the crystallization of metal nitrate.

Since changes can be made in carrying out the process herein disclosed without departing from the scope of this invention, it is intended that all matter contained in the above description or shown in the accompanying drawings shall be interpreted as illustrative and not in a limiting sense.

What is claimed is:

1. The process of producing nitrosyl chloride, which process comprises mixing nitric acid with a chloride from the group consisting of hydrogen chloride, alkali metal chlorides, and alkaline earth metal chlorides, passing nitric oxide into this reaction mixture and carrying out the reaction between said chloride and the nitric acid in the presence of said nitric oxide.

2. The process for the production of nitrosyl chloride by reacting nitric acid with a chloride from the group consisting of hydrogen chloride, alkali metal chlorides and alkaline earth metal chlorides, which process comprises introducing into a distillation column said chloride and nitric acid and passing this mixture countercurrently to a rising stream of nitrosyl chloride vapor produced from the reaction mixture while introducing into the reaction mixture from 0.05 to 1.50 mols of nitric oxide per mol of said chloride.

3. The process for the production of an alkali metal nitrate and nitrosyl chloride, which process comprises introducing into a distillation column an alkali metal chloride and nitric acid in the amounts of from 3.5 mols to 5 mols nitric acid per three mols of metal chloride and passing this mixture countercurrently to a rising stream of nitrosyl chloride vapor produced from the reaction mixture while introducing into the reaction mixture from 0.05 mol to 1.50 mols of nitric oxide per mol of said metal chloride and recycling through the reactor nitric acid obtained as mother liquor by concentrating the reaction mixture produced in said column, crystallizing the metal nitrate and separating the metal nitrate crystals from the mother liquor.

4. The process of producing nitrosyl chloride, which process comprises introducing into a distillation column reactor hydrogen chloride and nitric acid in amounts of approximately 3 mols of hydrogen chloride per mol of nitric acid and passing this mixture countercurrently to a rising stream of nitrosyl chloride vapor produced from the reaction mixture while introducing into the reaction mixture from 0.05 mol to 1.50 mols of nitric oxide per mol of said hydrogen chloride and recycling through the reactor nitric acid obtained by concentrating the reaction mixture produced in said column.

5. The process for the production of nitrosyl chloride by reacting nitric acid with a chloride from the group consisting of hydrogen chloride, alkali metal chlorides and alkaline earth metal chlorides, which process comprises introducing into a distillation column said chloride and nitric acid in approximately the stoichiometric proportions required for the reaction of the chloride with the nitric acid, and passing this mixture countercurrently to a rising stream of nitrosyl chloride vapor produced from the reaction mixture while introducing into the reaction mixture from 0.05 mol to 1.50 mols of nitric oxide per mole of said chloride and recycling through the reactor nitric acid obtained by concentrating the reaction mixture produced in said column.

6. The process of producing an alkali metal nitrate and nitrosyl chloride by reacting an alkali metal chloride with nitric acid, which process comprises, step (1) introducing into a distillation column said chloride and nitric acid in approximately the stoichiometric proportions required for the reaction of the metal chloride with nitric acid to produce metal nitrate and nitrosyl chloride, passing the mixture of chloride and nitric acid countercurrent to a rising stream of vapor containing nitrosyl chloride and initially substantially free of chlorine produced from the reaction mixture, introducing into the reaction mixture from 0.05 mol to 1.50 mols of nitric oxide per mol of said metal chloride, recycling through the reaction mixture in said column mother liquor obtained from step (3) of the process, said mother liquor containing from 35% to 68% nitric acid on a salt free basis, and carrying out the reaction of the chloride with the nitric acid in the presence of said nitric oxide to produce a reaction mixture containing from 30% to 45% nitric acid on a salt free basis, and taking off overhead a vapor stream containing nitrosyl chloride as its essential constituent; step (2) removing the reaction mixture from the base of said distillation column and concentrating the reaction mixture to remove water overhead; and step (3) crystallizing metal nitrate from the concentrated reaction mixture and passing the mother liquor thus produced containing from 35% to 68% nitric acid on a salt free basis to step (1) of the process.

7. The process of producing potassium nitrate and nitrosyl chloride, which process comprises; step (1) introducing into a distillation column potassium chloride and nitric acid in amounts of from 3.5 mols to 5 mols of nitric acid per three mols of potassium chloride, passing this mixture countercurrent to a rising stream of vapor containing nitrosyl chloride and initially substantially free of chlorine produced from the reaction mixture at the base of the column, recycling through the column mother liquor obtained from step (3) containing from 35% to 68% by weight nitric acid on a salt free basis, and introducing into said reaction mixture from 0.05 mol to 1.50 mols of nitric oxide per mol of potassium chloride thus depleting the strength of the nitric acid and producing a reaction mixture at the lower portion of said column containing from 30% to 45% nitric acid on a salt free basis; step (2) removing said reaction mixture from the base of said distillation column and concentrating the reaction mixture to remove water overhead; and step (3) crystallizing potassium nitrate from the concentrated reaction mixture and passing the mother liquor thus produced containing from 35% to 68% nitric acid on a salt free basis to step (1).

8. The process defined in claim 7 in which from 0.5 to 1 mol of nitric oxide per mol of potassium chloride is introduced into step (1).

9. The process of producing potassium nitrate and nitrosyl chloride, which process comprises; step (1) introducing potassium chloride and nitric acid having a concentration of from 40% to 68% by weight nitric acid in amounts of from 3.5 to 5 mols of nitric acid per three mols of potassium chloride, into a distillation column, passing this mixture downwardly in said column countercurrent to a rising stream of vapor produced from the reaction mixture at the base of said column, recycling through the reaction mixture mother liquor containing from 35% to 68% by weight of nitric acid on a salt free basis obtained from step (3), introducing nitrogen dioxide in said column below the level of introduction of the nitric acid and potassium chloride, introducing into the reaction mixture from 0.1 to 1.50 mols of nitric oxide per mol of potassium chloride and thus depleting the strength of the nitric acid in the reaction mixture at the base of said distillation column and producing a reaction mixture containing from 30% to 45% nitric acid on a salt free basis, taking off overhead a vapor stream containing nitrosyl chloride as its essential constituent; step (2) removing the reaction mixture from the base of said distillation column and concentrating the reaction mixture to remove water overhead; and step (3) crystallizing potassium nitrate from the concentrated reaction mixture and feeding the mother liquor thus produced containing from 35% to 68% nitric acid on a salt free basis to step (1) of the process.

10. The process of producing nitrosyl chloride, which process comprises; step (1) introducing hydrogen chloride and nitric acid into a distillation column in approximately the stoichiometric proportions required for the reaction of hydrogen chloride with nitric acid to produce nitrosyl chloride, passing the hydrogen chloride and nitric acid countercurrent to a rising stream of nitrosyl chloride vapor produced from the reaction mixture at the base of the column while recirculating through the reaction mixture nitric acid produced in step (2), and reacting the hydrogen chloride with the nitric acid in the presence of nitric oxide introduced into the lower portion of the column in amount of from 0.05 to 1.50 mols of nitric oxide per mol of hydrogen chloride to produce a reaction mixture containing from 30% to 45% nitric acid on a salt free basis at the base of said column; and step (2) removing the reaction mixture from the base of said distillation column, concentrating the reaction mixture to remove water overhead, and feeding the concentrated nitric acid thus produced containing from 35% to 68% to step (1) of the process.

11. The process of claim 10 in which the fresh nitric acid introduced into the distillation column has a concentration of from 40% to 68% by weight.

12. The process of producing nitrosyl chloride, which process comprises introducing into a distillation column a chloride from the group consisting of hydrogen chloride, alkali metal chlorides and alkaline earth metal chlorides, introducing nitric acid into said distillation column, passing the mixture of nitric acid and said chloride countercurrent to a rising stream of nitrosyl chloride vapor produced from the reaction mixture, introducing into the reaction mixture at the base of said distillation column nitric oxide in amount to produce a reaction mixture having a markedly lower concentration of nitric acid than the concentration of nitric acid present when the same reactants are reacted under the same conditions but without introducing nitric oxide thereinto, and taking off from the upper portion of said column the nitrosyl chloride produced.

13. The process of producing nitrosyl chloride, which process comprises introducing into a distillation column a chloride from the group consisting of hydrogen chloride, alkali metal chlorides and alkaline earth metal chlorides, introducing nitric acid into said distillation column, passing the mixture of nitric acid and said chloride countercurrent to a rising stream of nitrosyl chloride vapor produced from the reaction mixture, introducing into the reaction mixture at the base of said distillation column nitric oxide in amount to produce a reaction mixture at the base of the distillation column containing from 30% to 40% by weight of nitric acid on a salt-free basis, and taking off overhead the nitrosyl chloride produced.

14. The process of producing nitrosyl chloride, which process comprises introducing into a distillation column a chloride from the group consisting of hydrogen chloride, alkali metal chlorides and alkaline earth metal chlorides, introducing nitric acid into said distillation column, passing the mixture of nitric acid and said chloride countercurrent to a rising stream of nitrosyl chloride vapor produced from the reaction mixture, introducing into the base of said distillation column and into the reaction mixture therein nitric oxide in amount to produce an overhead mixture consisting substantially entirely of nitrosyl chloride and substantially free of chlorine, and taking off overhead the nitrosyl chloride produced.

15. The process of producing alkaline earth metal nitrates and nitrosyl chloride, which comprises reacting an alkaline earth metal chloride with nitric acid by introducing into a distillation column said alkaline earth metal chloride and nitric acid in amount of from 3.5 mols to 5 mols of nitric acid per 3 mols of said alkaline earth metal chloride, passing this mixture countercurrent to a rising stream of nitrosyl chloride vapor produced from the reaction mixture while introducing into the reaction mixture from 0.05 mol to 1.50 mols of nitric oxide per mol of said metal chloride and recycling through the column nitric acid obtained as mother liquor by concentrating the reaction mixture produced in said column, crystallizing the alkaline earth metal nitrate, and separating the alkaline earth metal nitrate crystals from the mother liquor.

16. The process of producing alkaline earth metal nitrate and nitrosyl chloride, which process comprises; step (1) introducing into a distillation column an alkaline earth metal chloride and nitric acid in approximately the stoichiometric proportions required for the reaction of the metal chloride with nitric acid to produce the alkaline earth metal nitrate and nitrosyl chloride, passing the mixture of alkaline earth metal chloride and nitric acid countercurrent to a rising stream of vapor containing nitrosyl chloride and initially substantially free of chlorine produced from the reaction mixture, introducing into the reaction mixture from 0.05 mol to 1.50 mols of nitric oxide per mol of said alkaline earth metal chloride, recycling through the column mother liquor obtained from step (3) of the process, said mother liquor containing from 35% to 68% nitric acid on a salt-free basis, and carrying out the reaction of the alkaline earth metal chloride with the nitric acid in the presence of said nitric oxide to produce a reaction mixture containing from 30% to 45% by weight of nitric acid on a salt-free basis, and taking off overhead a vapor stream containing nitrosyl chloride as its essential constituent; step (2) removing the reaction mixture from the base of said distillation column and concentrating the reaction mixture to remove water overhead; and step (3) crystallizing alkaline earth metal nitrate from the concentrated reaction mixture and passing the mother liquor thus produced containing from 35% to 68% nitric acid on a salt-free basis to step (1) of the process.

References Cited by the Examiner

UNITED STATES PATENTS

| | | | |
|---|---|---|---|
| 2,296,762 | 9/42 | Beekhuis | 23—102 |
| 3,062,616 | 11/62 | Chadwick | 23—102 |
| 3,062,617 | 11/62 | Beekhuis | 23—102 |
| 3,062,618 | 11/62 | Sullivan | 23—102 |
| 3,062,619 | 11/62 | Beekhuis | 23—102 |

MAURICE A. BRINDISI, *Primary Examiner.*